United States Patent
Nell

(10) Patent No.: US 8,738,578 B1
(45) Date of Patent: May 27, 2014

(54) GROWING DATA STRUCTURES

(75) Inventor: William Richard Nell, Natick, MA (US)

(73) Assignee: The Mathworks, Inc., Natick, MA (US)

( * ) Notice: Subject to any disclaimer, the term of this patent is extended or adjusted under 35 U.S.C. 154(b) by 391 days.

(21) Appl. No.: 12/979,061

(22) Filed: Dec. 27, 2010

(51) Int. Cl.
*G06F 17/30* (2006.01)

(52) U.S. Cl.
USPC ............................ 707/641; 707/801; 711/170

(58) Field of Classification Search
USPC .......... 711/145, 137, 171, 172, 213; 707/634, 707/674; 716/102, 104, 106; 710/200
See application file for complete search history.

(56) References Cited

U.S. PATENT DOCUMENTS

| | | | | |
|---|---|---|---|---|
| 5,418,942 | A * | 5/1995 | Krawchuk et al. | 1/1 |
| 6,295,594 | B1 * | 9/2001 | Meier | 711/171 |
| 7,171,537 | B1 * | 1/2007 | Moir et al. | 711/170 |
| 7,502,906 | B2 * | 3/2009 | Moir et al. | 711/170 |
| 7,739,477 | B2 * | 6/2010 | Bradford et al. | 711/206 |
| 7,783,852 | B2 * | 8/2010 | Lahiri et al. | 711/170 |
| 8,447,833 | B2 * | 5/2013 | Nightingale et al. | 709/217 |
| 2001/0032281 | A1 * | 10/2001 | Daynes | 710/200 |
| 2004/0078540 | A1 * | 4/2004 | Cirne et al. | 711/170 |
| 2007/0186074 | A1 * | 8/2007 | Bradford et al. | 711/202 |
| 2007/0208760 | A1 * | 9/2007 | Reuter et al. | 707/100 |
| 2007/0214194 | A1 * | 9/2007 | Reuter | 707/204 |
| 2007/0214314 | A1 * | 9/2007 | Reuter | 711/114 |
| 2008/0126842 | A1 * | 5/2008 | Jacobson et al. | 714/6 |
| 2010/0250613 | A1 * | 9/2010 | Ostrovsky et al. | 707/801 |
| 2011/0029822 | A1 * | 2/2011 | Moser | 714/45 |
| 2012/0124107 | A1 * | 5/2012 | Matsa et al. | 707/816 |

* cited by examiner

*Primary Examiner* — Jean M Corrielus
(74) *Attorney, Agent, or Firm* — Harrity & Harrity, LLP

(57) ABSTRACT

A system is configured to: determine whether criteria are met to grow a structure; calculate, when the criteria are met, a new size of the structure based on at least one or more of: a predefined curve, a total number of elements to be stored in the structure, an amount of available memory, or architecture information corresponding to the processor; allocate an area in memory to store the structure based on the new size; and store the elements of the structure in the area, where the area comprises space to add additional elements to the structure. The new size of the structure may be greater than the total number of elements.

20 Claims, 6 Drawing Sheets

GROWING DATA STRUCTURES

BACKGROUND

Computer programming languages may allow a programmer to declare dynamic data structures that may grow, during the execution of a program, when the data structures need to store additional data. Each time that a size of a dynamic data structure needs to be expanded to store additional data, a new area in memory needs to be allocated for the expanded data structure and all of the data previously stored by the data structure needs to be copied into the newly allocated area in memory. As a result, time and computing resources are wasted by the requirements for the individual iterations of growing a data structure. For example, $O(n^2)$ time may be required to grow an array to store "n" number of elements when one element is added to the array at a time.

To avoid growing a data structure each time that additional element(s) are added to the data structure, a programmer may initially pre-allocate memory for the data structure to store additional data that may be added to the data structure at future points in time. However, users may not know to or not know how to properly pre-allocate memory for a data structure. Other users may find requirements of adding code to pre-allocate memory for a data structure burdensome. Also, programmers often have no way of predicting/determining, during coding of a program, how much data will be stored in a data structure during the execution of the program. Accordingly, these programmers do not know how much memory to pre-allocate for the data structure. For example, pre-allocation for one data structure may not be used to provide for enough memory to avoid growing the structure when two or more data structures are concatenated during execution of a program.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
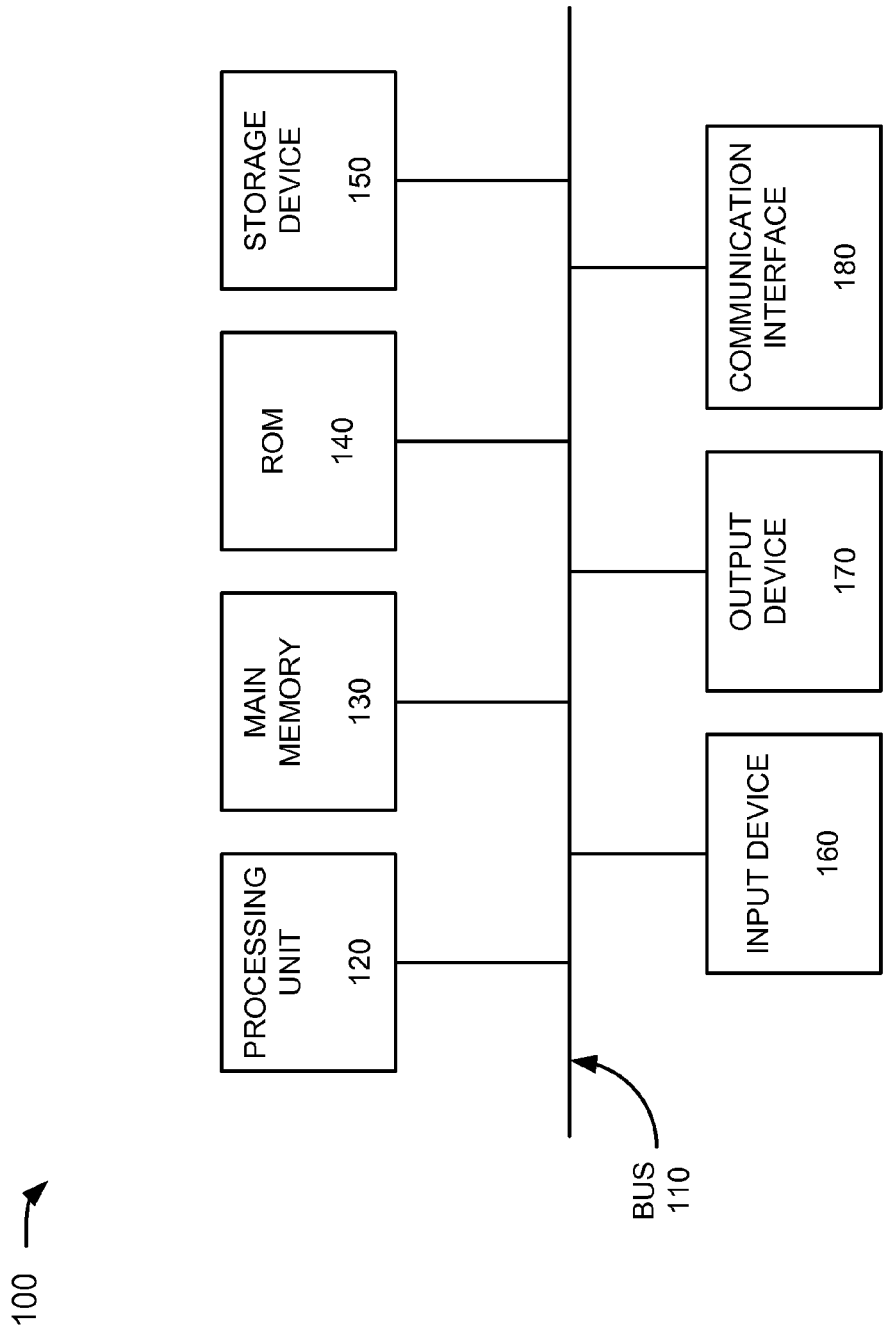
FIG. 1 is a diagram of an example device of an environment in which systems and/or methods described herein may be implemented.

The following detailed description refers to the accompanying drawings. The same reference numbers in different drawings may identify the same or similar elements.

Overview

An implementation, described herein, may heuristically grow data structures. Data structures may be created in computer programs to store and organize data. A single data structure may store multiple (related or unrelated) elements. Each element of a data structure may correspond to an individual piece of data and/or data object. An area of computer memory may be allocated to store the data structure when a computer program is compiled and executed. Herein, allocating memory may refer to callocing, mallocing, reallocing, and/or any other subroutines for performing memory allocation. Increasing a size of a data structure increases a number of elements that may be stored in the data structure. A size of a data structure may refer to a number of elements that may be stored in the data structure in its present form (i.e., without allocating a new area in memory for the data structure and moving the data structure to the new area). A size of a dynamic data structure may be increased during the execution of a computer program when new elements are added to the dynamic data structure. Examples of dynamic data structures may include heterogeneous array containers (e.g., heterogeneous array, cell array, etc.), dynamic structures, matrices, etc. A heterogeneous array container may include multiple elements (e.g., cells) corresponding to data objects of different types. For example, a heterogeneous array may include/store a first element, a second element, and a third element. The first element may include a heterogeneous array. The second element may include a value (e.g., integer, character, string, etc.). The third element may include a dynamic structure. A dynamic structure may include one or more fields that store variables and/or other data objects of different types (e.g., heterogeneous array, integer, character, string, array, etc.).

A programmer may initialize a dynamic data structure (herein, "structure") in a computer program. A library associated with the structure may store an algorithm for growing the structure. The structure may include a header. A bit of the header may be used to indicate whether the structure is in a "normal state" or a "heuristic state." The bit, during compiling, may first be set (initialized) to indicate that the structure is in the normal state. All of the elements of the data structure may be filled with data. The computer program may execute instruction(s), function(s), and/or procedure(s) that may require adding additional elements to the data structure. A determination may be made that a size of the data structure needs to be increased to store the additional elements. A total number of elements may be calculated by adding a quantity of elements in the structure and a quantity of the additional elements. Code for the algorithm to grow the structure may be executed to calculate a new size for the structure. The algorithm may calculate the new size based on a variety of factors, including, for example, the total number of elements, predefined thresholds associated with a type of the structure, an amount of available memory in the computer, an amount of memory allotted for the structure (e.g., a maximum size of a type of the structure), architecture information of the computer (e.g., a 32 bit architecture, a 64 bit architecture, etc.), etc. The new size of the structure may be greater than the total number of elements. An area in memory may be allocated to store the structure of the new size.

For example, the algorithm may calculate the new size based on an S curve. The S curve may slowly ramp up a rate of growth of a size the curve (e.g., the amount of over-allocated space that is calculated for the structure as the structure is growing) and then ramp down the rate of growth of the size the curve. For example, a structure may first grow linearly (i.e., a size of the structure may equal the total number of elements to be stored in the structure at a time when additional elements are added to the structure), then by doubling (i.e., a size of the structure may equal twice the total number of elements to be stored in the structure at a time when the size is doubled), and then by a constant amount (i.e., a size of the structure may equal a constant amount in addition to the total number of elements to be stored in the structure at a time when the size is increased). The elements that were previously part of the structure and the additional elements may be stored as part of the new structure in the newly allocated area in memory. If a state of the structure indicates that the structure is in the normal state, the state may be switched to indicate that the structure is in the heuristic state. A structure in the heuristic state may specify that the area in memory of the structure may include free space for additional elements (i.e., that a size of the structure does not need to be increased to store the additional elements as part of the structure). Thereafter, if new additional elements need to be added to the structure, the structure is in the heuristic state, and the total number of elements to be stored in the structure is less than the size of the structure, then the new additional elements may be added to the structure without increasing the size of the structure (and, accordingly, without allocating a new space in the memory and copying the structure to the new space).

Example Device

FIG. 1 is a diagram of an example device 100 of an environment in which systems and/or methods described herein may be implemented. Device 100 may include any device capable of compiling and executing source code. In one implementation, device 100 may take the form of a computer, a server, a smart phone, a personal computer, a laptop, a handheld computer, a portable communication device (e.g., a mobile phone), etc. Device 100 may include one or more devices 100 and/or one or more of each one of the components of device 100.

As shown in FIG. 1, device 100 may include a bus 110, a processing unit 120, a main memory 130, a read-only memory (ROM) 140, a storage device 150, an input device 160, an output device 170, and/or a communication interface 180. In another implementation, device 100 may include additional components, fewer components, different components, or differently arranged components than are shown in FIG. 1. In some implementations, one or more components of device 100 may perform one or more tasks described as being performed by one or more other components of device 100.

Bus 110 may include a path that permits communication among the components of device 100. Processing unit 120 may include a processor, co-processors, a microprocessor, or another type of processing logic that may interpret and execute instructions. Main memory 130 may include a random access memory (RAM) or another type of dynamic storage device that may store information and instructions for execution by processing unit 120. ROM 140 may include a ROM device or another type of static storage device that may store static information and/or instructions for use by processing unit 120. Storage device 150 may include a magnetic and/or optical recording medium and its corresponding drive. In some implementations, main memory 130 or storage device 150 may also be implemented as solid state memory, such as flash-based memory.

Input device 160 may include a mechanism that permits an operator to input information to device 100, such as a keyboard, a mouse, a pen, a single or multi-point touch interface, an accelerometer, a gyroscope, a microphone, voice recognition and/or biometric mechanisms, etc. Output device 170 may include a mechanism that outputs information to the operator, including a display, a printer, a speaker, etc. In the case of a display, the display may be a touch screen display that acts as both an input device 160 and an output device. Input device 160 and/or output device 170 may be haptic type devices, such as joysticks or other devices based on touch.

Communication interface 180 may include any transceiver-like mechanism that enables device 100 to communicate with other devices and/or systems. For example, communication interface 180 may include mechanisms for communicating with another device or system via a network.

As will be described in detail below, device 100 may perform certain operations. Device 100 may perform these operations in response to processing unit 120 executing software instructions (e.g., computer program(s)) contained in a computer-readable medium, such as memory 130, a secondary storage device (e.g., hard disk, CD-ROM, etc.) or other forms of RAM or ROM. A computer-readable medium may be defined as a non-transitory device. A memory device may include memory space within a single physical memory device or spread across multiple physical memory devices. The software instructions may be read into main memory 130 from another computer-readable medium, such as storage device 150, or from another device via communication interface 180. The software instructions contained in main memory 130 may cause processing unit 120 to perform processes that will be described later. Alternatively, hardwired circuitry may be used in place of or in combination with software instructions to implement processes described herein. Thus, implementations described herein are not limited to any specific combination of hardware circuitry and software.

A device 100, as described herein, may support local and/or distributed programming, compiling, and/or executing activities using computing grids, cloud-based computing environments, computing clusters, etc.

Example Process for Growing a Data Structure

Figure 2:
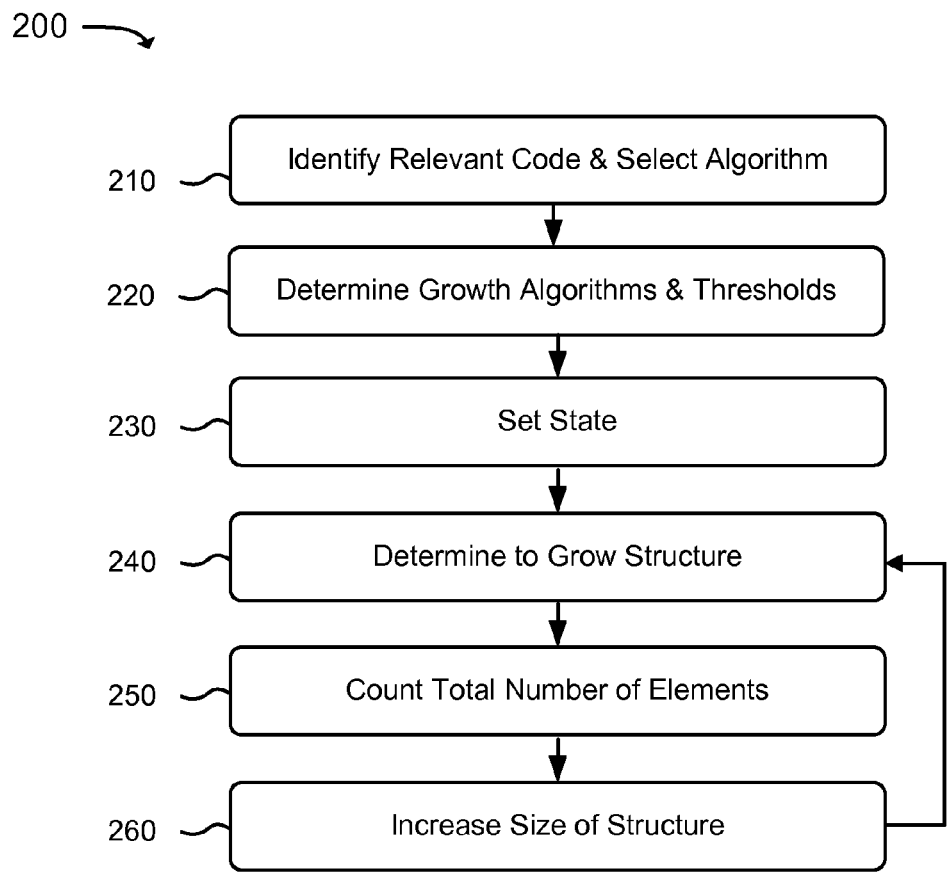
FIG. 2 is a flowchart of an example process for heuristically growing a data structure.

FIG. 2 is a flowchart of an example process 200 for heuristically growing a data structure. In one implementation, process 200 may be performed by device 100 or a combination of multiple devices 100.

Process 200 may include identifying relevant code and selecting an algorithm (block 210). For example, a programmer may enter code, including code declaring and/or initializing a structure (e.g., "x(i)=i;" where x is an array). The programmer may compile the code. A compiler may identify the code corresponding to the structure. A library that defines the structure may store an algorithm for heuristically growing the structure. In another implementation, declaring the structure may automatically include code (e.g., procedure, function, etc.) for an algorithm for heuristically growing the structure. The code may be executed any time a size of the structure is increased.

Growth algorithms and thresholds may be determined (block 220). For example, during the compiling/execution of code including a structure, an algorithm for heuristically growing the structure may use other algorithms and/or thresholds to determine an over-allocated size of the structure. The algorithms and thresholds may be determined based on how the structure is used in the code (e.g., purpose of the program, other structures declared in the code, etc.), architecture information (e.g., 16 bit architecture, 32 bit architecture, 64 bit architecture, etc.) associated with the processor executing the code, and/or any other information that may be determined before executing the code. The algorithms and thresholds may be used for growing the size of the structure, as described further below in reference to FIG. 3. In another implementation, a user may set and/or select algorithms and/or thresholds. In yet another implementation, the algorithms and/or thresholds that are used for growing a structure may change based on a change in conditions of a processing environment, settings selected by a user, etc.

A state of a structure may be set (block 230). For example, a structure may include a header that stores information about the structure. The header may store information to indicate whether the structure is in a normal state or a heuristic state. When the structure is in the normal state, the size of the structure may equal the number of elements in the structure. When the structure is in the heuristic state, at one point in time, a size of the structure was over-allocated. A current size of the structure in the heuristic state may equal the maximum number of elements that may fit in a structure at a current time. Over-allocating the size of the structure may allow the structure to, at least initially, accommodate more elements than the number of elements in the structure. Accordingly, additional elements may be added to the structure at a future point in time without growing the size of the structure. During the compilation, a state of the structure may be set to normal state. In another implementation, a structure may not be defined until the structure comes into existence during execution of algorithm(s) to grow the structure, as described below.

A determination may be made whether to grow a structure (block 240). For example, a program, declaring a structure, may execute code, instruction(s), function(s), and/or procedure(s) that may require adding additional elements to the structure. A determination may be made whether criteria are met to grow the size of the structure. If a state of the structure is set to normal, the criteria are met since the structure needs to be grown to store the additional elements in the structure. A dimension may be stored to specify the number of elements in the structure. A sum may be calculated by adding the dimension and a number of additional elements to be added to the structure. If a state of the structure is set to heuristic, a determination may be made whether the sum is less than a current size of the structure. The current size of a structure may be a number equal to or greater than zero. If the determination is made that the sum is less than the current size of the structure, then the data structure does not need to be grown (and the criteria are not met). However, if a determination is made that the sum is equal to or greater than the size of the structure, then the structure needs to be grown to store the additional elements in the structure (i.e., the criteria are met). In another implementation, the criteria maybe met to grow the structure when the sum is greater than a current size of the structure (described below) and the sum is less than a predefined maximum size for a type of the structure. For example, a cell array data structure may be defined to store a maximum number (e.g., 1000) of elements. The maximum number may be a predefined maximum size for a structure that is of a cell array type.

A total number of elements may be counted (block 250). For example, after determining that a structure needs to be grown to store additional elements in the structure, a minimum size for the structure may be calculated. To do so, a total number of elements to be stored in the structure may be counted by adding a quantity of elements already part of the structure (i.e., a dimension of the structure or a current size of the structure) and a quantity of the additional elements. The quantity of additional elements may equal a quantity of elements of another structure that is being concatenated to a structure being grown. In another implementation, the total number of elements may be counted (block 250) before determining whether to grow a structure (block 240). A determination may be made that criteria are met for growing the structure when the total number of elements is greater than a current size of the structure.

Figure 3:
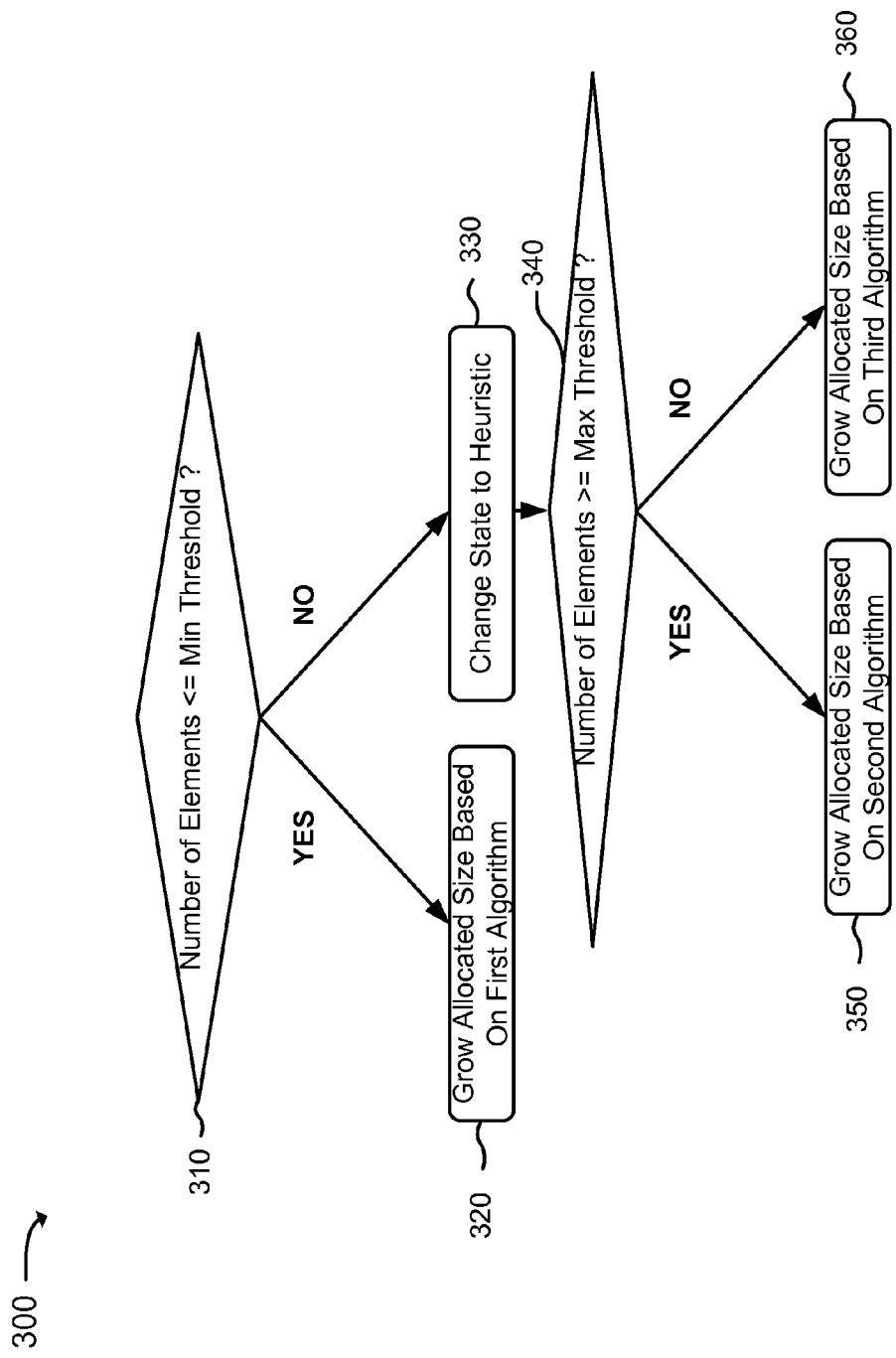
FIG. 3 is a flowchart of an example process for determining a new size of a data structure.

A size of a structure may be increased (block 260). For example, an algorithm for growing the structure may be used to calculate a new size of the structure (FIG. 3 illustrates an example of a process for calculating a new size of a structure). The algorithm may be based on a curve (e.g., S curve). The algorithm may calculate the new size based on a total number of elements to be stored in the structure, an amount of available memory, a limit of memory set for the structure, architecture information corresponding to a processor executing the code, etc. A new space in memory may be allocated for the structure based on the new size. The elements already in the structure may be copied from their previous area in memory to the new area. The additional elements may be stored as part of the structure within the new area of memory. The new area may include space to add additional elements to the structure at future points in time. Thereafter, device 100 may continuously, regularly, or periodically determine whether the structure needs to be grown again (block 240). Also, as described further below in reference to FIG. 5, device 100 may continuously, regularly, or periodically determine whether the structure and any other heuristically grown structures need to be shrunk due to a low amount of free memory.

Example Process for Determining Size of Data Structure

FIG. 3 is a flowchart of an example process 300 for determining a new size of a structure. Process 300 may be performed by device 100 or a combination of multiple devices 100. Process 300 may correspond to block 260 of process 200. The selection of algorithms and thresholds utilized by process 300 may correspond to block 220 of FIG. 2.

Process 300 may include determining whether a total number of elements is less than or equal to a minimum threshold (block 310). For example, a structure may include one or more elements. One or more additional elements may be added to the structure. The total number of elements may be calculated by adding a quantity of elements in the structure and a quantity of the additional elements. To calculate the new size of the structure, the total number of elements may be first compared to a minimum threshold (e.g., 256, 128, 512, etc.).

If the total number of elements is less than or equal to the minimum threshold (block 310—YES), an allocated size of the structure may be grown based on a first algorithm (block 320). For example, the first algorithm may calculate a new allocated size of the structure based on the total number of elements. An area in memory may be allocated for the expanded structure based on the new allocated size. The area may be completely filled with elements currently in the structure and the additional elements. No new elements may be added to the structure, after completely filling the structure, without growing the structure.

If the total number of elements is not less than or equal to (i.e., is greater than) the minimum threshold (block 310—NO), a state of the structure may be changed to a heuristic state (block 330). If the structure was in a normal state and a size of the structure is to be over-allocated to be greater than a total number of elements to be stored in the structure, then the state of the structure may be changed to be in a heuristic state. Furthermore, if the total number of elements is not less than or equal to (i.e., is greater than) the minimum threshold (block 310—NO), a determination is made whether the total number of elements is greater than or equal to a maximum threshold (block 340).

If the total number of elements is greater than or equal to a maximum threshold (block 340—YES), an allocated size of a structure may be grown based on a second algorithm (block 350). For example, the second algorithm may be executed to determine the allocated size. The allocated size may be determined by calculating a growth number (e.g., a constant number) and by assigning a sum of the growth number and a value associated with the current size of the structure to the allocated size. The growth number may be based on a maximum allowed size for a type of the structure. An area in memory may be allocated for the expanded structure based on the allocated size. The area may include additional space to add other elements to the structure, at future point(s) in time, after filling part of the area with elements currently in the structure and the additional elements. The other elements may be added to the structure without growing the structure if a quantity of the other elements is less than or equal to the free space provided by the over-allocated size.

If the total number of elements is not greater than or equal to (i.e., is less than) a maximum threshold (block 340—NO), an allocated size of the structure may be grown based on a third algorithm (block 360). For example, the third algorithm may be executed to determine the allocated size. The third algorithm may assign a multiple of the total number of elements (e.g., 2×500=1000) to the allocated size. An area in memory may be allocated for the expanded structure based on the allocated size (e.g., 1000). The area may include additional space to add other elements to the structure, at future point(s) in time, after filling part of the area with elements currently in the structure and the additional elements.

Example Process for Adding Elements to a Data Structure

Figure 4:
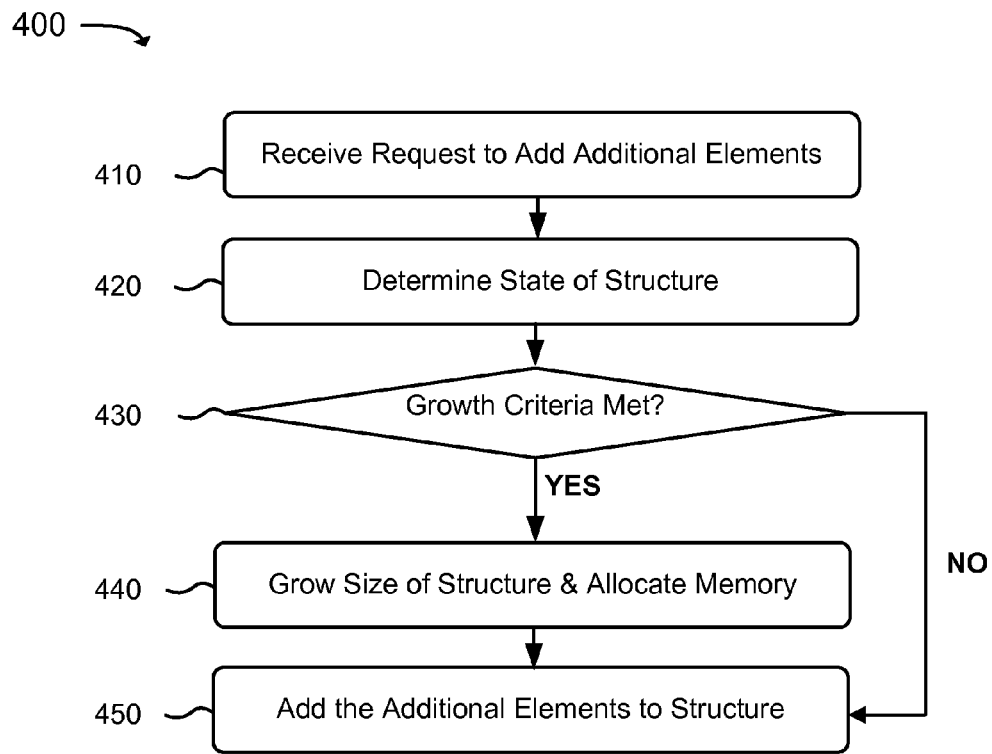
FIG. 4 is a flowchart of an example process for adding elements to a data structure.

FIG. 4 is a flowchart of an example process 400 for adding elements to a data structure. Process 400 may be performed by device 100 or a combination of multiple devices 100.

Process 400 may include receiving a request to add additional elements to a structure (block 410). For example, a structure may be declared and initialized. The program including the structure may perform an operation/routine that may generate a request to add additional elements to the structure. In one example, a function/procedure may be executed that outputs additional elements to be added to the structure. In another example, the structure may be concatenated with another array composed of one or more elements. In yet another example, new fields may be added to the structure to represent new properties of an object corresponding to the structure.

A state of the structure may be determined (block 420). For example, in response to receiving a request to add additional elements to the structure, a determination may need to be made whether a size of the structure needs to be increased. To do so, first, a state of the structure may need to be determined. The state of the structure may be a normal state or a heuristic state. A determination may be made whether growth criteria are met to increase the size of the structure based on the state. For example, the growth criteria may be met when a structure is in a normal state and all of the elements of the structure are filled. The growth criteria may also be met when a structure is in a heuristic state and a dimension of the structure (i.e., current number of elements in the structure) is equal to a current size of the structure (or when the dimension in addition to a quantity of the additional elements being added to the structure is greater than the current size of the structure).

If growth criteria are met (block 430—YES), a size of the structure may be grown and memory may be allocated (block 440). When the growth criteria are met, a growth number may be calculated. The growth number may represent an increase of a size of the structure. The growth number may be calculated based on a predefined curve (e.g., by using an algorithm and thresholds to approximate a behavior of a curve), a current size of the structure, a total number of elements to be stored in the structure, an amount of available memory for storing the structure (e.g., a total amount of free memory, a maximum amount of memory allocated for the structure, etc.), architecture information, etc. A new size of the structure may be calculated based on the growth number. For example, a sum of (a value associated with) a current size of the structure and the growth number may be assigned to (a value associated with) a new size of the structure. In one implementation, the new size of the structure may be greater than the total number of elements to be stored in the structure. An area in memory may be allocated to store the structure with the new size.

Additional elements may be added to the structure (block 450). After a new area in memory is allocated to store the structure with a new size (block 440), elements that were previously stored in the structure may be copied to the new area. Thereafter, additional elements may be added to the new area to be stored as part of the structure. A dimension of the structure may be updated to equal a total number of elements in the structure. The dimension may be less than (or equal to) the new size of the structure.

If growth criteria are not met (block 430—NO), additional elements may be added to the structure (block 450). For example, growth criteria for growing a structure may not be met when the structure is in a heuristic state and a total number of elements to be stored in the structure(number of elements already in the structure and number of additional elements) is less than a current size of the structure. When the growth criteria are not met, the additional elements may be added to a part of an area in memory currently allocated for the structure. A dimension of the structure may be increased by a number of the additional elements (e.g., the dimension may be assigned the total number of elements).

Example Process for Shrinking Structures

Figure 5:
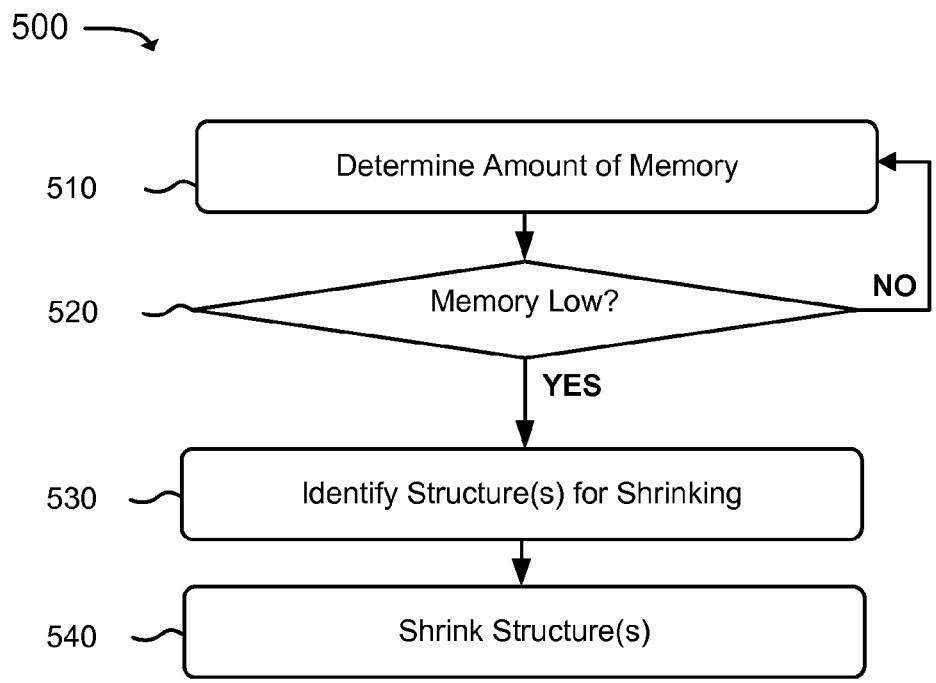
FIG. 5 is a flowchart of an example process for shrinking data structures.

FIG. 5 is a flowchart of an example process 500 for shrinking structures. Process 500 may be performed by device 100 or a combination of multiple devices 100.

Process 500 may include determining an amount of memory (block 510). For example, one or more structures may be heuristically grown, as described above. Thereafter, device 100 may continuously, regularly, or periodically determine the amount of available memory (e.g., free memory in device 100, free memory in the amount of memory allocated for the structure(s), etc.) when/after a predefined condition is met. The predefined condition may be met, for example, when a time interval elapses, another structure is heuristically grown, processing speed decreases, etc. After determining the amount of available memory, device 100 may determine whether the amount of available memory is low based on whether the amount of available memory is less than a predefined amount.

If the amount of memory is not low (e.g., equal to or greater than the predefined amount) (block 520—NO), device 100 may again to determine the amount of memory when a predefined condition is met (block 510). If the amount of memory is low (e.g., less than the predefined amount) (block 520—YES), one or more structure(s) may be identified for shrinking (block 530). For example, device 100 may identify all of the structures that are currently in a heuristic state.

Identified structures may be shrunk (block 540). For example, device 100 may determine a dimension of an identified structure and a current size of the structure. In one implementation, device 100 may decrease the size of the structure to equal the dimension of the structure. In another implementation, device 100 may calculate a shrink size of the structure based on the dimension, the current size, and other factors (e.g., amount of available memory, architecture information, purpose of the structure, etc.). The shrink size may be greater than the dimension and less than the current size. A part of an area in memory allocated for the structure may be de-allocated based on the shrink size.

Example Process for Front-End Allocation

Figure 6:
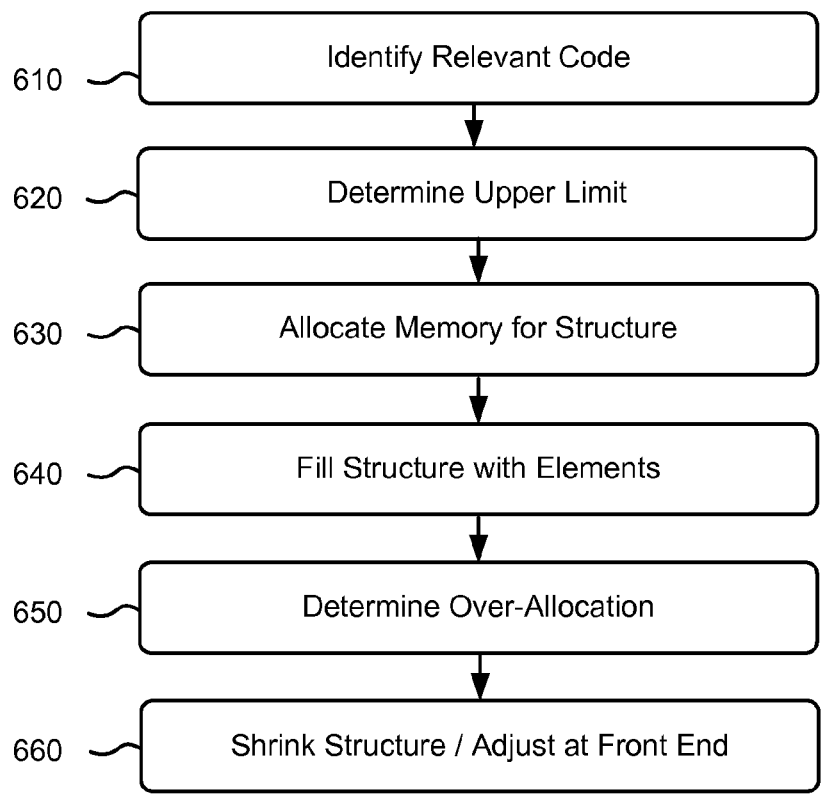
FIG. 6 is a flowchart of an example process for front-end allocation.

FIG. 6 is a flowchart of an example process 600 for front-end allocation. Process 600 may be performed by device 100 or a combination of multiple devices 100.

Process 600 may include identifying relevant code (block 610). For example, a programmer may declare a structure "x" and include code (e.g., a loop that adds additional elements to the structure) that will increase a size of the structure when the code is executed. The code may be compiled. During the compilation of the code, the compiler may identify the relevant code (e.g., for i=1:n x(i)=i; end) that will increase the size of the structure. The relevant code may be identified by comparing the code to a pattern corresponding to a type of the structure. For example, a compiler may identify code that matches a pattern for a loop filling elements of a cell array. After identifying relevant code for a structure whose size will grow, the compiler may add code to pre-allocate memory for the structure (e.g., heterogeneous arrays, dynamic structure, etc.). The compiler may generate pre-allocate code based on a type of the structure. The compiler may insert the pre-allocate code to transform the relevant code to code that pre-allocates memory for the structure. For example, the loop "for i=1:n x(i)=i; end" may be transformed as follows:

```
limit = n;              //factor out the loop limit
x = preallocate(limit); //preallocate x.
for i = 1:limit
    x(i) = i;
end;
```

An upper limit may be determined (block 620). For example, the transformed code may determine an upper limit (e.g., limit) of the structure. The upper limit may correspond to a maximum size of the structure that will be pre-allocated for the structure. The compiler may use an algorithm, associated with a type of the structure, to calculate the upper limit. The compiler may calculate the upper limit based on the type of the structure, a purpose of the structure (e.g., use of the structure in the relevant code), an amount of available memory, architecture information, etc. In the code above, the upper limit for structure x may be determined to equal "n" based on the "n" in the loop "for i=1:n x(i)=i; end." In another implementation, a compiler may determine an upper limit of the structure before inserting pre-allocation code. The pre-allocation code may be generated based on the upper limit.

Memory for the structure may be allocated (block 630). For example, an upper limit may specify a size of the structure. An area in memory may be allocated for the structure based on the upper limit. Code to pre-allocate memory for structure x may include, for example: "x=preallocate (limit);". The function/procedure "preallocate" may pre-allocate the area in the memory based on the "limit."

The structure may be filled with elements (block 640). After memory is pre-allocated for the structure, the structure may be filled with elements. Each one of the elements to the structure may correspond to a different value and/or data object. For example, a first element of the structure may store an integer, a second element of the structure may store a heterogeneous array, and a third element of the structure may store a string. In the example code provided above, structure x may be filled with elements whose values equal their corresponding index "i" in the structure. Code to assign values to elements of structure x may include, for example:

```
for i = 1:limit
    x (i) = i;
end;
```

Over-allocation may be determined (block 650). For example, after filling elements of the structure, a determination may be made regarding whether criteria are met for over-allocation. Over-allocation may occur when a part of an area of a memory that was pre-allocated for the structure is not used (i.e., is not filled with elements). In other words, over-allocation may occur when a size of the structure is greater than a quantity of elements in the structure. In one implementation, the over-allocation may be due to a loop, which filled the structure, exiting early due to an error, break, return, etc. In another implementation, the over-allocation may be due to incorrectly determining the upper limit. The criteria for over-allocation may be met when an upper limit that was calculated for the structure is greater than the number of elements in the structure.

The structure may be shrunk or adjusted at front end (block 660). In one implementation, in response to determining an over-allocation of an area in memory for the structure, a size of the structure may be shrunk. A new shrunk size of the structure may be determined based on the number of elements in the structure. A difference may be calculated between the current size of the structure and the new shrunk size. A part of the area in memory that was pre-allocated for the structure may be identified based on the difference. The part may be de-allocated from the area in the memory that is reserved for the structure.

In another implementation, in response to determining an over-allocation of an area in memory for a structure, information may be stored about the over-allocation. When the structure is handled at a later point in time at a front end, the information may be used to adjust operations that are based on the structure. For example, an application may determine that only the first 20 of 100 elements of a cell array were filled and store information that the cell array was over-allocated and that only the first 20 elements are filled. At a front end, a loop may display the values of the cell array. Based on the stored information, the loop may repeat only 20 times to display only values corresponding to the first 20 elements of the cell array instead of repeating 100 times to display values corresponding to all 100 elements of the cell array.

CONCLUSION

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 2-6, the order of the blocks may be modified in other implementations. Further, non-dependent blocks may be performed in parallel.

Also, the term "user" has been used herein. The term "user" is intended to be broadly interpreted to include, for example, a programmer, a workstation, or a user of a workstation.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions, described herein, may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory computer-readable storage media storing instructions, the instructions comprising:
    one or more instructions that, when executed by a processor, cause the processor to:
        obtain program code that implements a data structure,
            the data structure being implemented during an execution of the program code,
            a size of the data structure being equal to a quantity of first elements included in the data structure, and
            the data structure being in a first state based on the size of the data structure being equal to the quantity of the first elements;
        execute, during the execution of the program code, a first portion of the program code,
            executing the first portion of the program code requiring one or more second elements to be added to the data structure;
        determine, based on the data structure being in the first state, that first criteria, for determining whether to increase the size of the data structure, are met;
        calculate, based on the first criteria being met, a new size of the data structure based on at least one or more of:
            an algorithm,
            a curve,
            a total quantity of the first elements and the one or more second elements,
            an amount of available memory, or
            architecture information corresponding to the processor,
            the new size of the data structure being greater than the total quantity of the first elements and the one or more second elements;
        allocate an area, in a memory, for storing the data structure based on the new size;
        add the one or more second elements to the data structure by storing the first elements and the one or more second elements in the area,
            the data structure being in a second state based on the new size of the data structure being greater than the total quantity of the first elements and the one or more second elements;
        execute, during the execution of the program code, a second portion of the program code,
            executing the second portion of the program code requiring one or more third elements to be added to the data structure;
        determine, based on the data structure being in the second state, that second criteria, for determining whether to increase the new size of the data structure, are not met; and
        add the one or more third elements to the data structure by storing the one or more third elements in the area.

2. The one or more non-transitory computer-readable storage media of claim 1, where the one or more instructions to determine that the second criteria are not met include:
    one or more instructions that, when executed by the processor, cause the processor to:
        determine that a total quantity of the first elements, the one or more second elements, and the one or more third elements is less than the new size of the data structure, and
        determine that the second criteria, for determining whether to increase the new size of the data structure, are not met based on the total quantity of the first elements, the one or more second elements, and the one or more additional elements being less than the new size of the data structure.

3. The one or more non-transitory computer-readable storage media of claim 1, where the one or more instructions to calculate the new size of the data structure include:
    one or more instructions that, when executed by the processor, cause the processor to:
        assign a value associated with the new size as a multiple of the total quantity of the first elements and the one or more second elements when the total quantity of the first elements and the one or more second elements is less than a particular threshold.

4. The one or more non-transitory computer-readable storage media of claim 3, where the particular threshold is a maximum threshold,
    where the one or more instructions to calculate the new size of the data structure further include:
    one or more instructions that, when executed by the processor, cause the processor to:
        assign the value associated with the new size of the data structure as a sum of a growth number and the total quantity of the first elements and the one or more second elements when the total quantity of the first elements and the one or more second elements is greater than or equal to the maximum threshold,
        where the growth number is based on the maximum threshold and the total quantity of the first elements and the one or more second elements.

5. The one or more non-transitory computer-readable storage media of claim 1, where the new size of the data structure is calculated based on the curve and the architecture information,
where the curve is an S curve, and
where the architecture information identifies a 32 bit architecture or a 64 bit architecture.

6. The one or more non-transitory computer-readable storage media of claim 1, where the one or more instructions to calculate the new size of the data structure include:
one or more instructions that, when executed by the processor, cause the processor to:
assign the total quantity of the first elements and the one or more second elements as a value associated with the new size when the total quantity of the first elements and the one or more second elements is less than or equal to a first threshold; and
assign, when the total quantity of the first elements and the one or more second elements is greater than the first threshold, a multiple of the total quantity of the first elements and the one or more second elements as the value associated with the new size when the total quantity of the first elements and the one or more second elements is less than a second threshold.

7. The one or more non-transitory computer-readable storage media of claim 1, where the instructions further comprise:
one or more instructions that, when executed by the processor, cause the processor to:
identify, based on obtaining the program code, code corresponding to the data structure; and
select the algorithm for the data structure based on the code; and
where the one or more instructions to calculate the new size of the data structure include:
one or more instructions that, when executed by the processor, cause the processor to execute the algorithm to calculate the new size of the data structure.

8. The one or more non-transitory computer-readable storage media of claim 1, where the total quantity of the first elements and the one or more second elements equals a sum of:
a quantity of particular first elements of the first elements included in the data structure prior to calculating the new size, and
a size of a second data structure or a quantity of elements included in the second structure, and
where the first elements and the one or more second elements comprise the elements included in the second data structure concatenated to the particular first elements at a time when the data structure is of a particular size, the time being prior to calculating the new size.

9. A method comprising:
obtaining program code that implements a data structure,
the data structure being implemented during an execution of the program code,
a size of the data structure being equal to a quantity of first elements associated with the data structure,
obtaining the program code being performed by a device, and
the data structure being in a first state based on the size of the data structure being equal to the quantity of the first elements;
executing, during the execution of the program code, a first portion of the program code,
executing the first portion of the program code requiring a set of second elements to be added to the data structure, and
executing the first portion of the program code being performed by the device;
determining, based on the data structure being in the first state, to increase the size of the data structure,
determining to increase the size of the data structure being performed by the device;
calculating, when a total quantity of the first elements and the set of second elements is less than or equal to a first threshold, a new size of the data structure based on a first algorithm,
calculating the new size of the data structure based on the first algorithm being performed by the device;
calculating the new size of the data structure based on a second algorithm when the total quantity of the first elements and the set of second elements is greater than or equal to a second threshold,
the second algorithm not being equal to the first algorithm, and
calculating the new size based on the second algorithm being performed by the device;
allocating an area in memory based on the new size,
allocating the area being performed by the device;
adding the set of second elements to the data structure by storing the first elements and the set of second elements in the area,
storing the first elements and the set of second elements being performed by the device,
the area comprising space for storing one or more new elements to add the one or more new elements to the data structure, and
the data structure being in a second state based on the area comprising the space for storing the one or more new elements;
executing, during the execution of the program code, a second portion of the program code,
executing the second portion of the program code requiring the one or more new elements to be added to the data structure, and
executing the second portion of the program code being performed by the device;
determining, based on the data structure being in the second state, not to increase the new size of the data structure,
determining not to increase the new size of the data structure being performed by the device; and
adding the one or more new elements to the data structure by storing the one or more new elements in the area,
adding the one or more new elements to the data structure being performed by the device.

10. The method of claim 9, further comprising:
calculating the new size of the data structure based on a third algorithm when the total quantity of the first elements and the set of second elements is greater than the first threshold and is less than the second threshold,
the third algorithm not being equal to the second algorithm or the first algorithm.

11. The method of claim 10, where calculating the new size based on the third algorithm includes:
calculating a multiple of the total quantity of the first elements and the set of second elements based on a particular multiplier associated with a type of the data structure; and
assigning the multiple as a value associated with the new size.

12. The method of claim 9, where calculating the new size based on the first algorithm includes:

assigning the total quantity of the first elements and the set of second elements as a value associated with the new size, and where calculating the new size based on the second algorithm includes:

calculating a growth number based on the total quantity of the first elements and the set of second elements and the second threshold, and assigning a sum of the growth number and a value associated with the size of the data structure, prior to calculating the new size, as the value associated with the new size, the new size being greater than the total quantity of the first elements and the set of second elements.

13. The method of claim 9, where determining to increase the size of the data structure includes:

determining to increase the size of the data structure based on:

the total quantity of the first elements and the set of second elements being greater than the size of the data structure, and the total quantity of the first elements and the set of second elements being less than a particular maximum size associated with a type of the data structure.

14. The method of claim 9, where the data structure includes an array composed of the first elements.

15. A system comprising:

a memory to store elements included in a data structure, the data structure being implemented during an execution of program code, and the data structure being in a first state based on a size of the data structure being equal to a current quantity of the elements included in the data structure; and a processor to:

execute, during the execution of the program code, a first portion of the program code, executing the first portion of the program code requiring one or more additional elements to be added to the data structure;

determine, based on the data structure being in the first state, to increase the size of the data structure;

calculate a new size of the data structure based on a first algorithm when a sum of the current quantity and a quantity of the one or more additional elements is greater than or equal to a threshold;

calculate the new size of the data structure based on a second algorithm when the sum is less than the threshold, the second algorithm not being equal to the first algorithm;

allocate an area in the memory based on the new size;

add the one or more additional elements to the data structure by storing the first elements and the one or more additional elements in the area, the area comprising space to store one or more new elements, and the data structure being in a second state based on the area comprising the space to store the one or more new elements;

execute, during the execution of the program code, a second portion of the program code, executing the second portion of the program code requiring the one or more new elements to be added to the data structure;

determine, based on the data structure being in the second state, not to increase the new size of the data structure; and add the one or more new elements to the data structure by storing the one or more new elements in the space.

16. The system of claim 15, where the data structure being in the second state indicates that the new size of the data structure is greater than the sum.

17. The system of claim 15, where the processor is further to:

decrease the new size of the data structure to a shrink size when an amount of available memory is less than a particular amount.

18. The system of claim 17, where, when decreasing the new size of the data structure, the processor is to:

de-allocate a part of the area to cause the shrink size to be less than the new size, where the shrink size is equal to a sum of the current quantity, the quantity of the one or more additional elements, and a quantity of the one or more new elements.

19. The system of claim 15, where the data structure includes a dynamic language structure, where the one of the additional elements correspond to an additional field being added to the dynamic language structure, and where the one or more additional elements include one or more of:

an integer, a real number, a character, a string, or an array.

20. The system of claim 15, where the sum is a first sum, and where, when calculating the new size based on the first algorithm, the processor is to execute the first algorithm to:

calculate a growth number based on a constant, and assign a second sum of the growth number and the first sum as a value associated with the new size, and where, when calculating the new size based on the second algorithm, the processor is to execute the second algorithm to:

calculate a multiple of the first sum based on a multiplier associated with a type of the data structure, and assign the multiple as the value associated with the new size.

* * * * *